(12) United States Patent
Mitchell et al.

(10) Patent No.: US 7,823,922 B2
(45) Date of Patent: Nov. 2, 2010

(54) TETHER SYSTEMS FOR INFLATABLE CUSHIONS

(75) Inventors: Abe Mitchell, Brigham City, UT (US); Jim Huss, Plain City, UT (US); Bryan LaVon Walston, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/174,546

(22) Filed: Jul. 16, 2008

(65) Prior Publication Data
US 2010/0013203 A1     Jan. 21, 2010

(51) Int. Cl.
B60R 21/213    (2006.01)
(52) U.S. Cl. .................................. 280/743.2; 280/730.2
(58) Field of Classification Search .............. 280/743.2, 280/730.2; *B60R 21/21, 21/213*
See application file for complete search history.

(56) References Cited

U.S. PATENT DOCUMENTS

| | | | |
|---|---|---|---|
| 6,237,939 B1 | 5/2001 | Resh | |
| 6,273,458 B1 | 8/2001 | Steffens, Jr. et al. | |
| 6,361,068 B1 * | 3/2002 | Stein et al. | 280/730.2 |
| 6,367,836 B1 | 4/2002 | Tanase et al. | |
| 6,375,214 B1 * | 4/2002 | Nishikaji | 280/728.2 |
| 6,375,216 B1 | 4/2002 | Eschbach | |
| 6,428,037 B1 * | 8/2002 | Bakhsh et al. | 280/729 |
| 6,454,296 B1 * | 9/2002 | Tesch et al. | 280/730.2 |
| 6,464,250 B1 | 10/2002 | Faigle et al. | |
| 6,565,118 B2 | 5/2003 | Bakhsh et al. | |
| 6,695,347 B2 | 2/2004 | Sonnenberg et al. | |
| 6,945,558 B2 | 9/2005 | Hall et al. | |
| 2003/0090091 A1 * | 5/2003 | Dominissini et al. | 280/730.2 |
| 2007/0182143 A1 * | 8/2007 | Wright | 280/743.2 |
| 2008/0079246 A1 * | 4/2008 | Dix | 280/730.2 |

OTHER PUBLICATIONS

Notification of Transmittal of the International Search Report and the Written Opinion of the International Searching Authority issued Aug. 14, 2009 in International Application No. PCT/US2009/048781.

* cited by examiner

*Primary Examiner*—Ruth Ilan
*Assistant Examiner*—Keith Frisby
(74) *Attorney, Agent, or Firm*—Sally J Brown; Stoel Rives LLP (57) ABSTRACT

An inflatable airbag cushion assembly with a tether system for use in a vehicle. The airbag and the tether are configured such that upon airbag deployment the tether applies sufficient tension to the cushion to mitigate occupant ejection from the vehicle.

27 Claims, 10 Drawing Sheets

TETHER SYSTEMS FOR INFLATABLE CUSHIONS

TECHNICAL FIELD

The present disclosure relates generally to the field of automotive protective systems. More specifically, the present disclosure relates to tether systems for inflatable cushions.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings in which:

INDEX OF ELEMENTS IDENTIFIED IN THE DRAWINGS 10 vehicle
11 A pillar
12 B pillar
13 C pillar
100 airbag assembly
110 cushion membrane
111 upper portion
112 lower portion
113 front face
114 rear face
115 inflation cells
116 non-inflatable portion
117 seam
118 side edge
119 fold line
120 tether system
121 tether strap
122 first end of strap
123 second end of strap
124 extended portion of strap
125 tether strap attachment
126 anchor
130 sliding member
136 tether system coupling strap
140 tether system coupling point
141 aperture
142 coupling strap attachment point
200 airbag assembly
210 cushion membrane
211 upper portion
212 lower portion
213 front face
214 rear face
215 inflation cells
216 non-inflatable portion
217 seam
218 side edge
220 tether system
221 strap
222 first end of strap
223 second end of strap
224 middle portion of strap
225 tether strap attachment
226 anchor
230 sliding member
240 tether system coupling point
242 coupling strap attachment point
300 airbag assembly
310 cushion membrane
311 upper portion
312 lower portion
313 front face
314 rear face
315 inflation cells
316 non-inflatable portion
317 seam
318 side edge
319 fold line
320 tether system
321 strap
322 first end of strap
323 second end of strap
324 middle portion of strap
326 anchor
340 tether system coupling point
341 aperture in cushion
342 attachment point
343 tether strap attachment

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

During installation, the airbags are typically rolled, folded, or both, and are retained in the rolled/folded state behind a cover. During a collision event, vehicle sensors trigger the activation of an inflator, which rapidly fills the airbag with inflation gas. Thus the airbag rapidly changes configurations from the rolled/folded configuration to an expanded configuration.

Figure 1A:
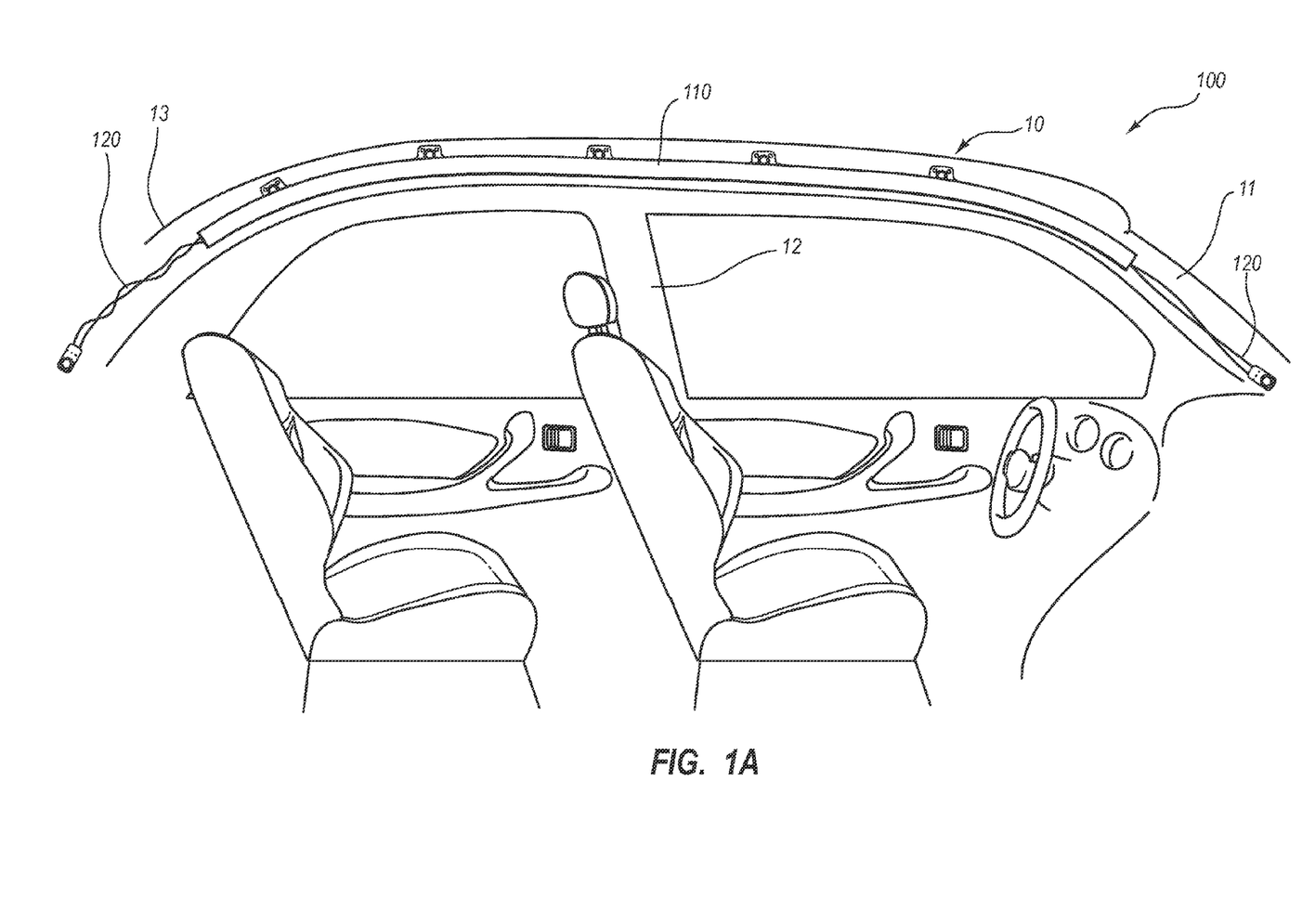
FIG. 1A is a side elevation view of an airbag assembly mounted in a vehicle, wherein the airbag is in a packaged configuration.

FIG. 1A depicts airbag assembly 100, from a side elevation view, wherein the assembly has been mounted in a vehicle 10 that has an A pillar 11, a B pillar 12, and a C pillar 13. Airbag assembly 100 may comprise an inflatable curtain cushion 110 and a tether system 120. Curtain cushion 110 is depicted in a packaged configuration, which may comprise rolling, folding, or a combination of rolling and folding. The airbag assemblies disclosed herein are configured such that the inflatable curtain cushion and tether system can be configured into a packaged conformation by rolling, folding, or by using a combination of rolling and folding. Tether system 120 is configured to stabilize and tension cushion membrane 110 during and after cushion membrane deployment. Additionally, tether system 120 is configured to tension a lower portion of the inflatable curtain to mitigate the risk of occupant ejection, such as during a rollover event. As will become apparent by reference to the following detailed description and accompanying figures, some components of the tether systems disclosed herein may be considered to be part of the inflatable cushions described herein.

Figure 1B:
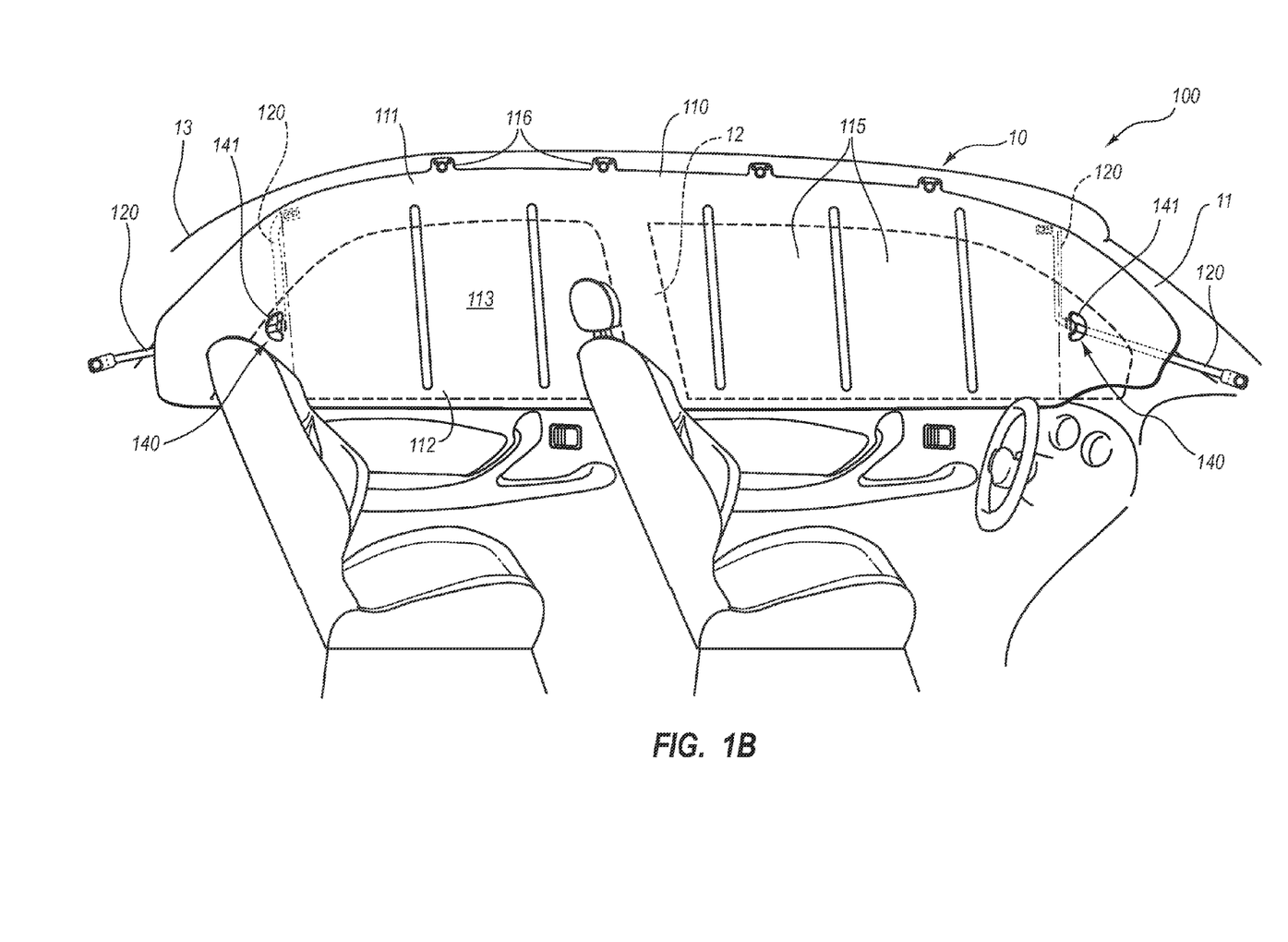
FIG. 1B is a side elevation view of the airbag assembly of FIG. 1A, wherein the airbag is in an extended configuration.

FIGS. 1B-2D depict the airbag assembly of FIG. 1A from side elevation views. FIG. 1B depicts inflatable curtain cushion membrane 110 in an extended configuration, wherein the cushion has an upper portion 111, a lower portion 112, a front face 113, a rear face (not shown), a seam 117, a side edge 118, a fold line 119, and a tether system coupling point 140. The various faces of cushion membrane 110 define an interior inflatable void that may be divided into inflation cells 115 that are in fluid communication with an inflator, and non-inflatable portions 116, which are not. The cushion may be attached to a vehicle structure, such as a head rail via mounting hardware and attachment tabs that are formed in non-inflatable portions.

Upon deployment, cushion 110 is configured to at least partially overlap and provide occupant impact protection from one or more end pillars of a vehicle, such as A pillar 11 and C pillar 13. Cushion 110 is also configured to overlap and provide occupant impact protection from one or more interior pillars, such as B pillar 12. Assembly 100 may be configured in such a way that the assembly comprises multiple cushion membranes that are configured to span various portions of a vehicle. For example in some embodiments, assembly 100 may comprise separate inflators and airbags for at least partially overlapping and spanning the space between the A to B pillars or the B to D pillars.

Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

Tether system 120 is configured to allow the inflatable curtain cushion 110 to be packaged into a stored configuration by rolling. Tether system 120 is also configured to tension and position cushion 110 during deployment such that the curtain is positioned between the occupants of a vehicle and vehicle pillars or objects protruding into the vehicle cabin, and tensioned sufficiently to reduce the risk of occupant ejection during a rollover event.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable curtain cushion; a rear passenger side airbag; a driver's side airbag; and/or a front passenger airbag. Also, the cushion membrane may comprise one or more of any material well known in the art, such as a woven nylon fabric. Additionally, the airbag cushion may be manufactured using a variety of techniques such as one piece weaving, "cut and sew," or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2A:
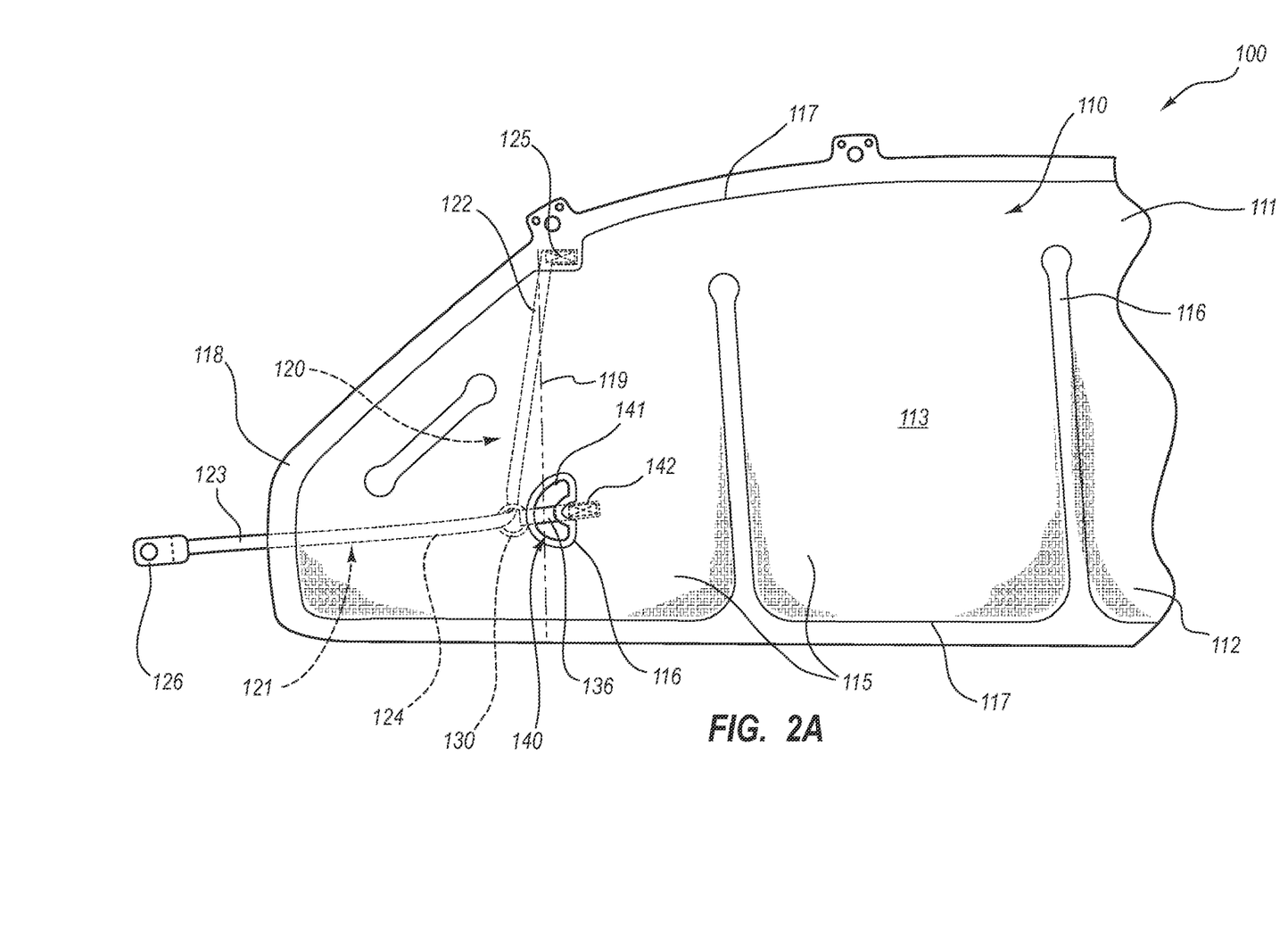
FIG. 2A is a close-up side elevation view of the opposite side of airbag assembly 100 as shown in FIG. 1B.

FIGS. 2A-2D are close-up side elevation views of airbag assembly 100. As depicted in FIG. 2A, cushion 110 comprises one or more seams 117 that define inflatable areas, such as inflation cells 115 and non-inflatable areas 116. Tether system coupling point 140 is located on cushion 110 at a non-inflatable portion 116 and may comprise an aperture 141 and a tether strap attachment point 142. Aperture 141 may be said to at least partially define tether system coupling point 140, and tether attachment point 142 may comprise a tab or an extension of cushion 110. In alternative embodiments, the coupling point may not comprise an aperture and the attachment point may not comprise an extension or tab.

Figure 2B:
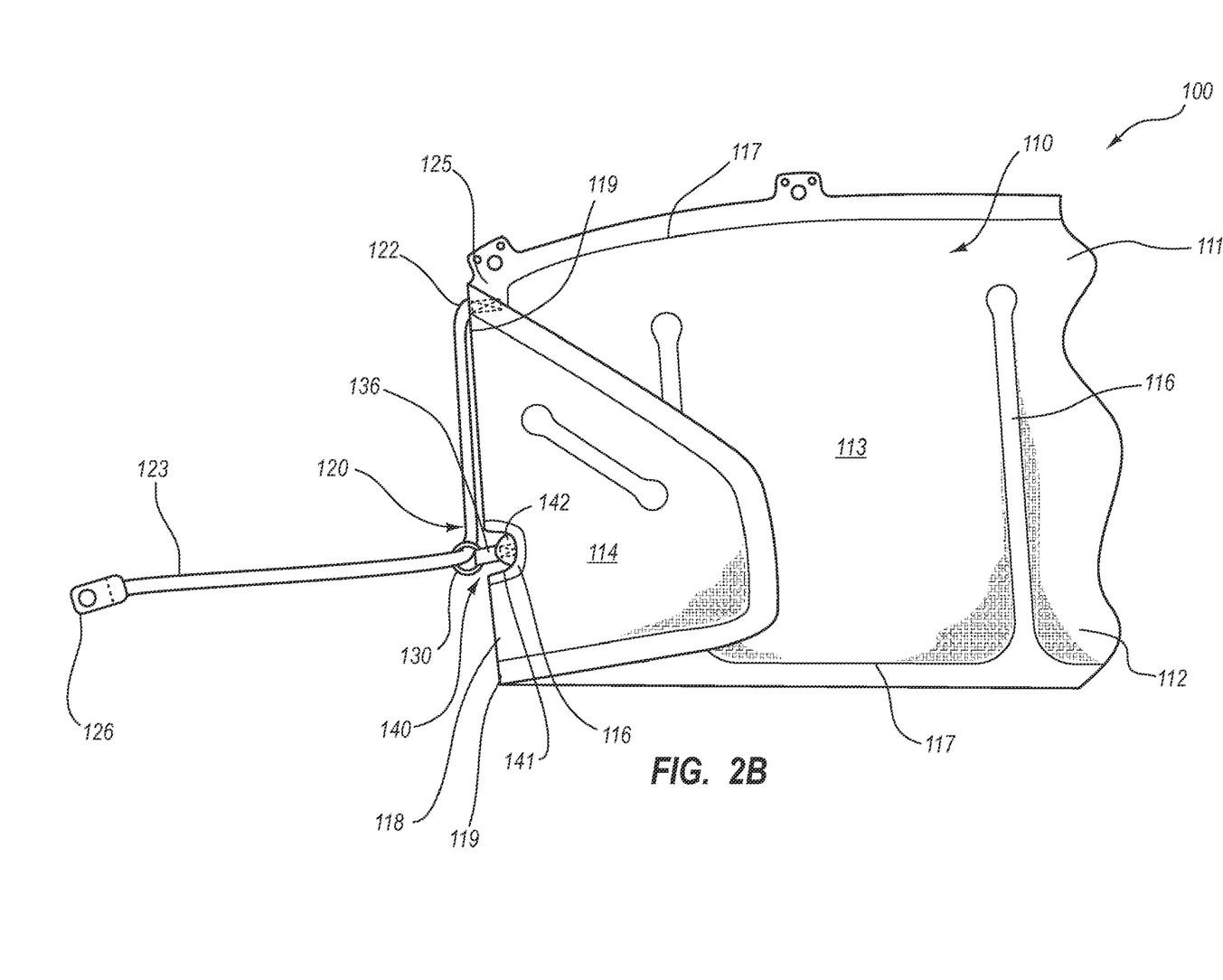
FIG. 2B is a side elevation view of the airbag assembly as shown in FIG. 2A after a portion of the cushion has been folded.
Figure 2C:
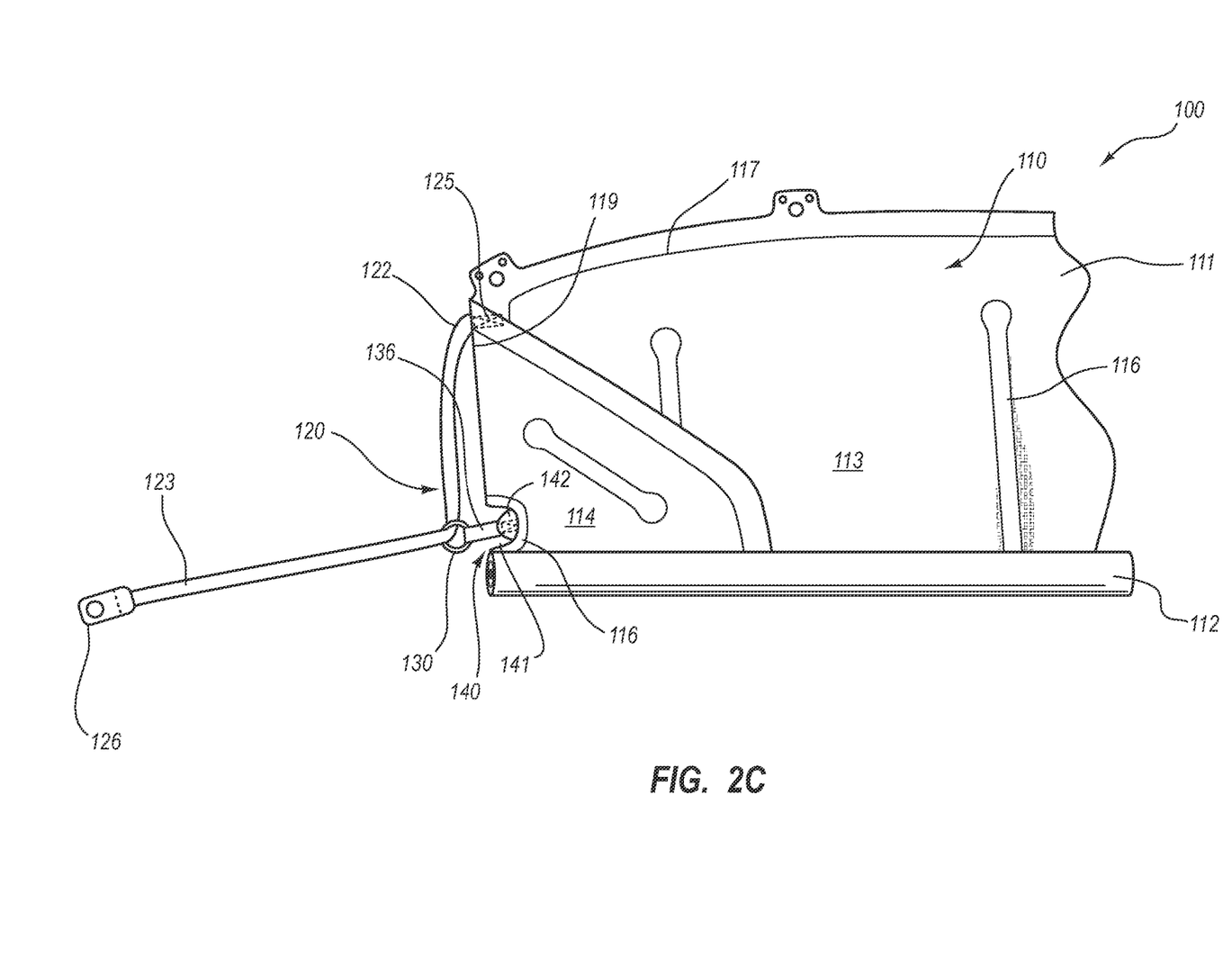
FIG. 2C is a side elevation view of the airbag assembly as shown in FIG. 2A after a portion of the cushion has been rolled into a packaged configuration.

Tether system 120 may comprise a tether strap 121, an anchor 126, a sliding member 130, and a tether system coupling strap 136. Tether strap 121 may comprise nylon webbing or any other material known in the art and has a first end 122, a second end 123, and an extended portion 124 that comprises a middle portion of the tether strap that lies between the first end and the second end. First end 122 may be attached to a top edge of cushion 110 at a non-inflatable portion that is on the outside of seam 117. First end 122 of tether strap 121 is attached to the cushion at attachment point 125. Attachment point 125 is configured such that at the attachment point, the long axis of tether strap 121 is substantially perpendicular to a side edge 118 of cushion 110. The side edge to which the first end of the tether strap is attached may be substantially perpendicular to the side edge of the cushion depicted at 118, or a side edge that is formed by folding a cushion along a fold line. FIGS. 2A-2C depict attachment 125 as being on rear face 114 of cushion 110; however, in alternative embodiments, the attachment may be on the front face of the cushion.

Second end 123 may be coupled to anchor 126 which is configured to be fixedly attached to a vehicle structure, such as a pillar. Anchor 126 is configured to receive mounting hardware or alternatively to clip into a vehicle structure or coupling member. In this way, tether strap 121 is fixedly coupled on at least one end to a vehicle structure. Second end 123 may be coupled to anchor 126 via an attachment, which may comprise stitching or any other suitable coupling technique.

Extended portion 124 of strap 121 is configured to be captured by sliding member 130, or in other words, the extended portion is configured to slide within sliding member 130. Sliding member 130 may comprise plastic, metal, or fabric. Sliding member 130 may be coupled to coupling strap 136 by being contained within a loop of coupling strap 136 that is closed by sewing the strap to itself or attachment point 142. In an alternative embodiment, the sliding member may be attached directly to cushion 110. FIG. 2A depicts sliding member 130 as a ring; however in alternative embodiments the sliding member may not comprise a ring structure. Tether system coupling strap 136 may be coupled to front face 113 of cushion 110, or in other words, a front face of attachment point 142. When cushion 110 is in a packaged state or mounted in a vehicle, the coupling strap may extend through aperture 141. Tether system coupling strap 136 may comprise a piece of nylon webbing or any other suitable material. Tether system coupling strap 136 may be attached to cushion 110 at attachment point 142 via stitching, or any other suitable technique.

FIG. 2A depicts cushion 110 in an extended configuration prior to packaging, which is similar to the configuration the cushion adopts when it is in a deployed state. In a deployed state, the inflatable portions of cushion 110 are filled with inflation gas, and tether system 120 allows tension to be transmitted to the cushion, especially lower portion 112, which may comprise the lower ⅓ of the cushion.

FIG. 2B depicts assembly 100 after a portion of cushion 110 has been folded along fold line 119, wherein a new side edge 118 is formed. A portion of rear face 114 is visible, where the fold lies on front face 113. After cushion 110 has been folded along fold line 119, tether system 120 is located substantially outside the cushion. The portion of first end 122 of strap 121 that comprises attachment 125 and a portion of coupling strap 136 that is attached to cushion 110 may not be located outside cushion 110 after the cushion has been folded along fold line 119.

FIG. 2C depicts assembly 100 after lower portion 112 of cushion 110 has been rolled. The roll depicted in FIG. 2C may be described as a front roll, wherein bottom portion 112 of cushion 110 is rolled in the direction of front face 113, rather than rear face 114. In an alternative embodiment, the cushion may be reverse rolled.

Figure 2D:
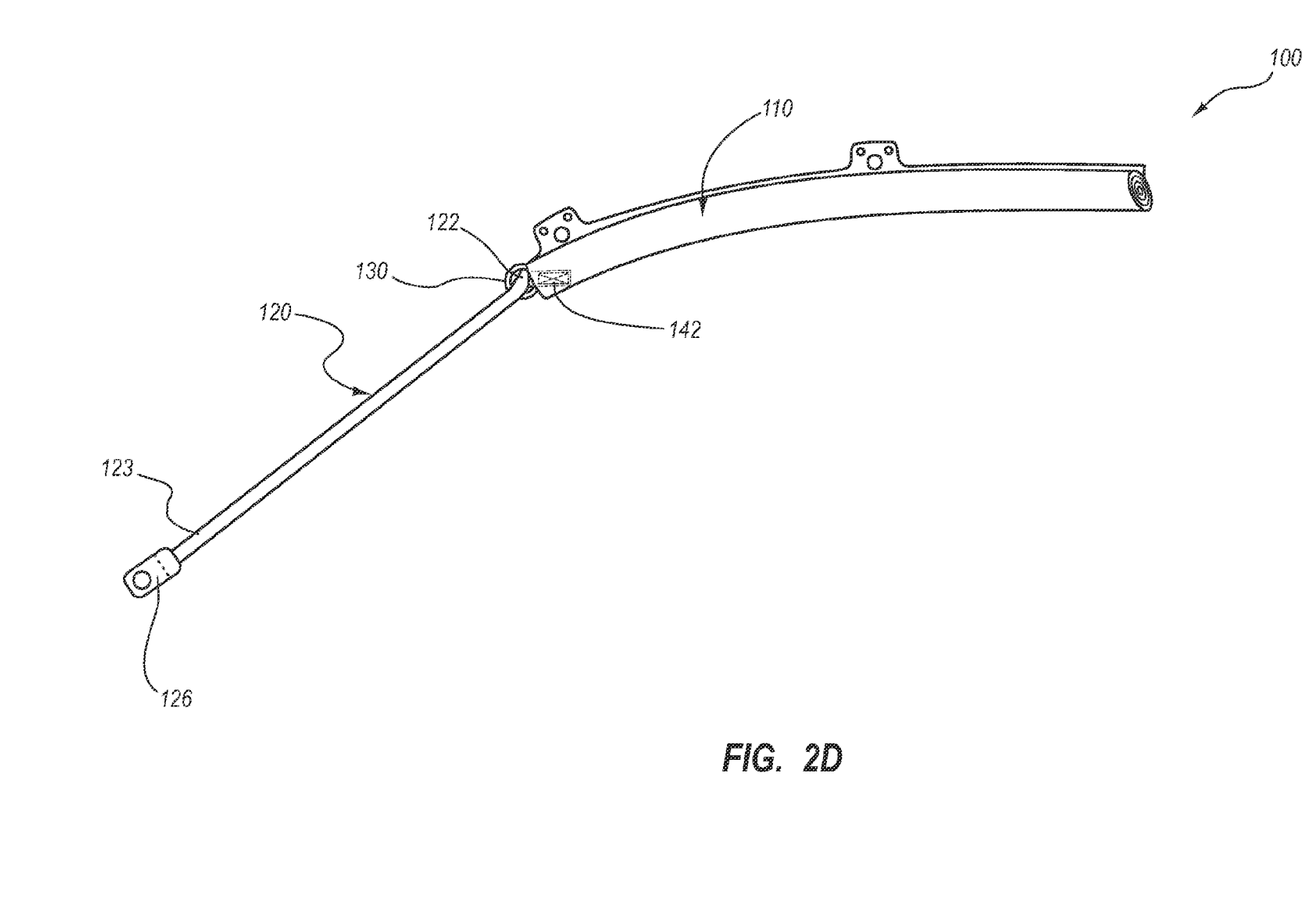
FIG. 2D is a side elevation view of the airbag assembly as shown in FIG. 2A after the cushion has been rolled into a packaged configuration.

FIG. 2D depicts assembly 100 after cushion 110 has been fully rolled and is ready for mounting in a vehicle or final packaging within a vehicle. Cushion 110 may be retained in the rolled configuration via a sock, one or more wrapping members, one or more clips or mounting tabs, or any other suitable technique or combination of techniques. After cushion 110 has been fully rolled, tether system 120 is located substantially outside rolled cushion 110, including anchor 126, second end 123, and sliding member 130. Portions of the tether system that may not be located outside the cushion after rolling include the portion of first end 122 of the tether strap that comprises tether strap attachment (not visible) and a portion of the coupling strap that is attached to cushion 110 at attachment 142.

As depicted in FIGS. 1A and 2D, when assembly 100 is in a rolled, pre-deployment packaged configuration, the tether strap follows a substantially linear path from the airbag cushion to the anchor that is attached to A pillar 11. Although FIG. 1A may imply that when in a packaged state and mounted in a vehicle, the tether strap has slack, the tether typically does not have slack when in a packaged and mounted state. Upon activation of the inflator and initial deployment, the cushion begins to unroll and adopt a configuration similar to that depicted in FIG. 2C. Upon unrolling sufficiently, the portion of the cushion that was folded along the fold line unfolds and the cushion adopts an extended configuration similar to that depicted in FIG. 2A.

In the packaged configuration (FIG. 2D), the sliding member may be located near the first end of the tether strap. During airbag deployment the sliding member may slide down the extended middle portion of the tether strap. At and after full deployment, the overall path followed by the tether strap between the cushion and the anchor is non linear, wherein the extended portion of the strap is bent or curved at the sliding member. The length of the tether strap is predetermined such that upon deployment, the curtain cushion can adopt its extended configuration, but is placed under tension by the tether.

Figure 3A:
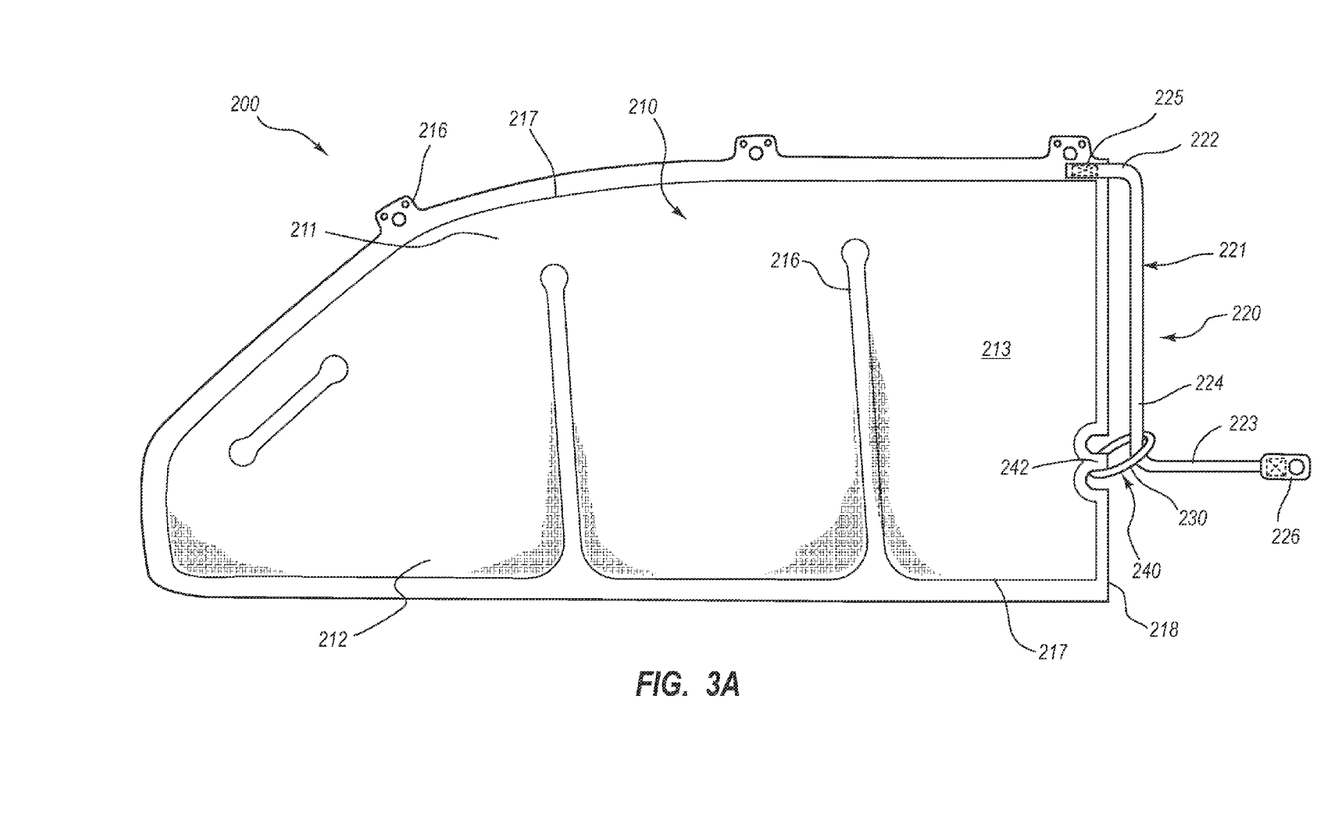
FIG. 3A is a side elevation view of another embodiment of an airbag assembly with a tether system.
Figure 3B:
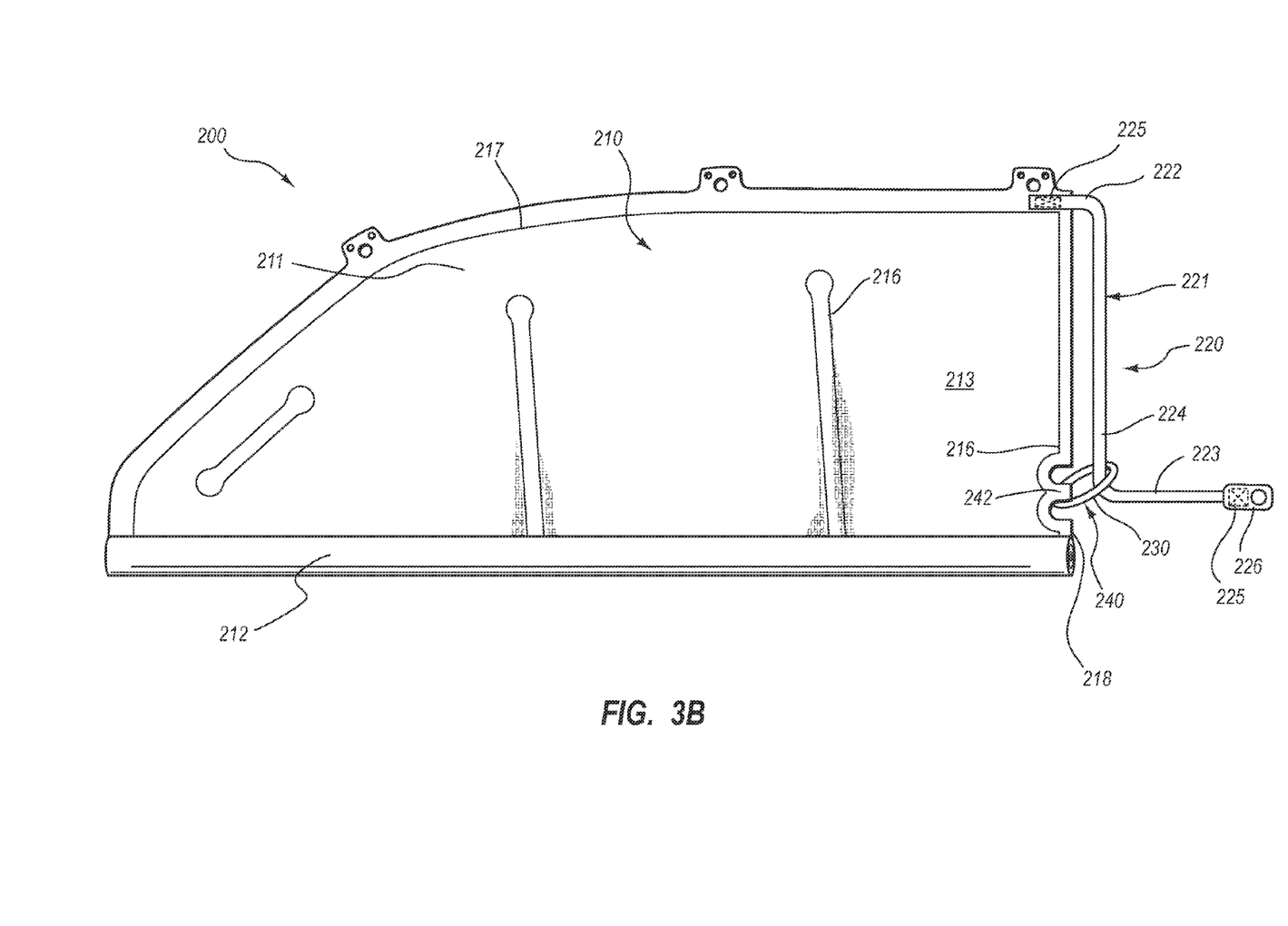
FIG. 3B is a side elevation view of the airbag assembly of FIG. 3A after a portion of the cushion has been rolled into a packaged configuration.

FIGS. 3A-3B are side elevation views of another embodiment of an airbag assembly 200. Assembly 200 may be configured similarly to and may function similarly as airbag assembly 100, described herein, except where the following description of assembly 200 varies from the previous description of assembly 100. As depicted in FIG. 3A, assembly 200 may comprise an inflatable airbag cushion 210 and a tether system 220. Inflatable cushion 210 may comprise a curtain cushion membrane 210 that when in an extended configuration has an upper portion 211, a lower portion 212, a front face 213, a rear face (not shown), a seam 217, a side edge 218, and a tether system coupling point 240. The various faces of cushion membrane 210 define an interior inflatable void that may be divided into inflation cells 215 that are in fluid communication with an inflator, and non-inflatable areas 216, which are not.

Tether system coupling point 240 is located on cushion 210 at a non-inflatable portion 216 and may comprise a tether strap attachment point 242. Tether attachment point 242 may comprise a tab or an extension of cushion 210 and the attachment point may or may not extend beyond side edge 218. In an alternative embodiment, the attachment point does not comprise an extension or tab, but comprises the side edge of the cushion.

In the depicted embodiment, tether system 220 comprises a tether strap 221, an anchor 226, and a sliding member 230. Tether strap 221 has a first end 222, a second end 223, and an extended portion 224. First end 222 may be attached to a top edge of cushion 210 at a non-inflatable portion 216 that is on the outside of seam 217. First end 222 of tether strap 221 is attached to the cushion at attachment point 225. Attachment point 225 is configured such that the long axis of tether strap 221 is substantially perpendicular to a side edge 218 of cushion 210. Attachment point 225 is depicted as being on front face 213 of cushion 210; however in an alternative embodiment, the attachment point may be located on the rear face of the cushion. Second end 223 may be coupled to anchor 226 which is configured to be fixedly attached to a vehicle structure, such as a pillar.

Extended portion 224 of strap 221 is configured to be captured by sliding member 230, or in other words, the extended portion is configured to slide within the sliding member. Sliding member 230 may be coupled to attachment point 242 directly, or may have a coupling member, such as a coupling strap as described in FIGS. 2A-2D. FIG. 3A depicts sliding member 230 as a ring; however in alternative embodiments the sliding member may not comprise a ring structure.

FIG. 3B depicts assembly 200 after lower portion 212 has been rolled. The roll depicted in the figure may be called a forward roll, and in some embodiments, cushion 210 may be reverse rolled, wherein the bottom portion 212 of the cushion is rolled in the direction of a rear face (not shown) rather than front face 213 as depicted. After cushion 210 has been fully rolled and configured into a packaged state, tether system 220 may be located substantially outside the rolled cushion. A portion of first end 222 of strap 221 that comprises attachment 225 is located within rolled cushion 210.

Figure 4A:
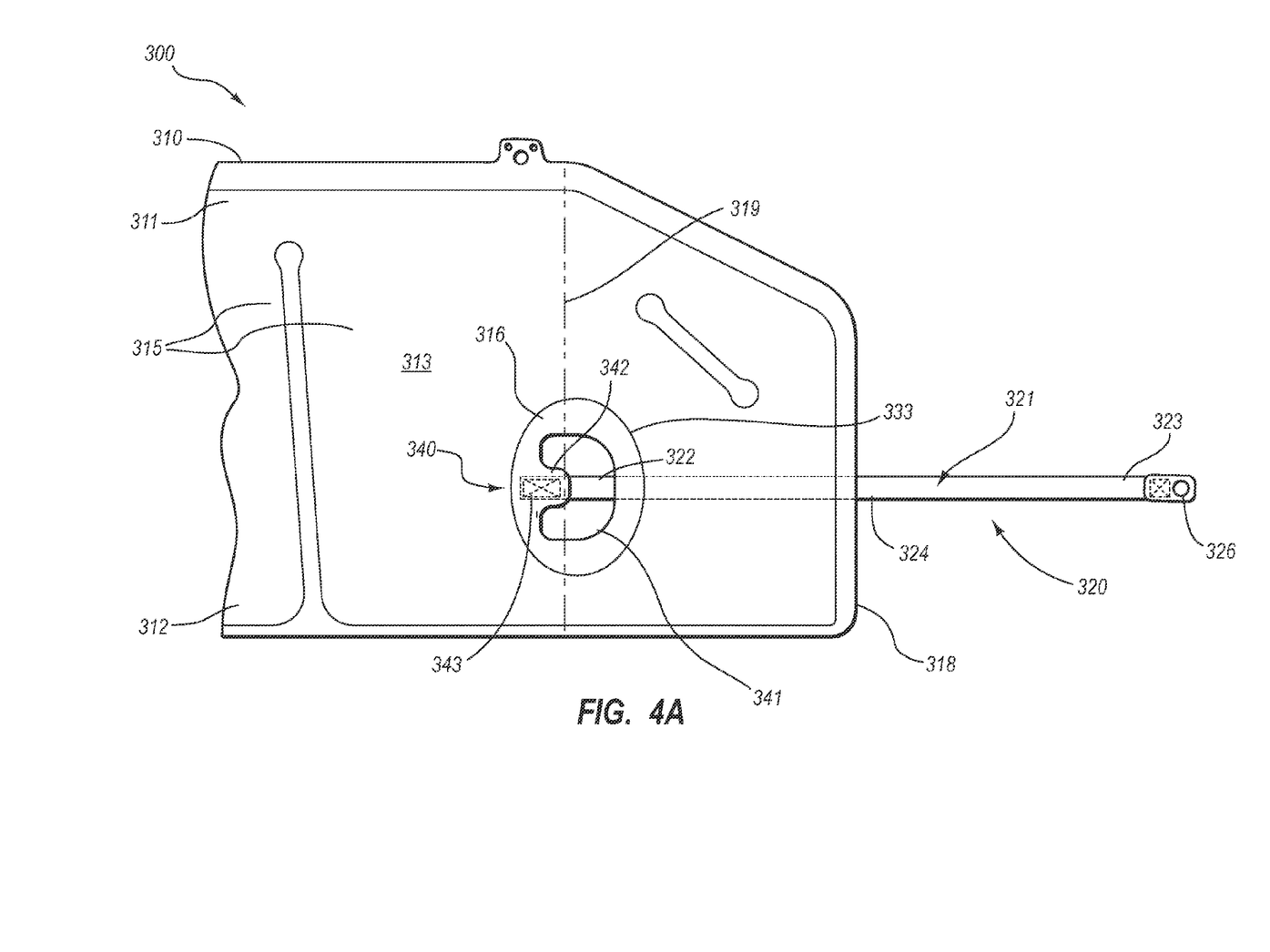
FIG. 4A is a side elevation view of another embodiment of an inflatable curtain cushion assembly with a tether system; and, FIG. 4B is a side elevation view of the inflatable curtain cushion assembly of FIG. 4A after a portion of the cushion has been folded.
Figure 4B:
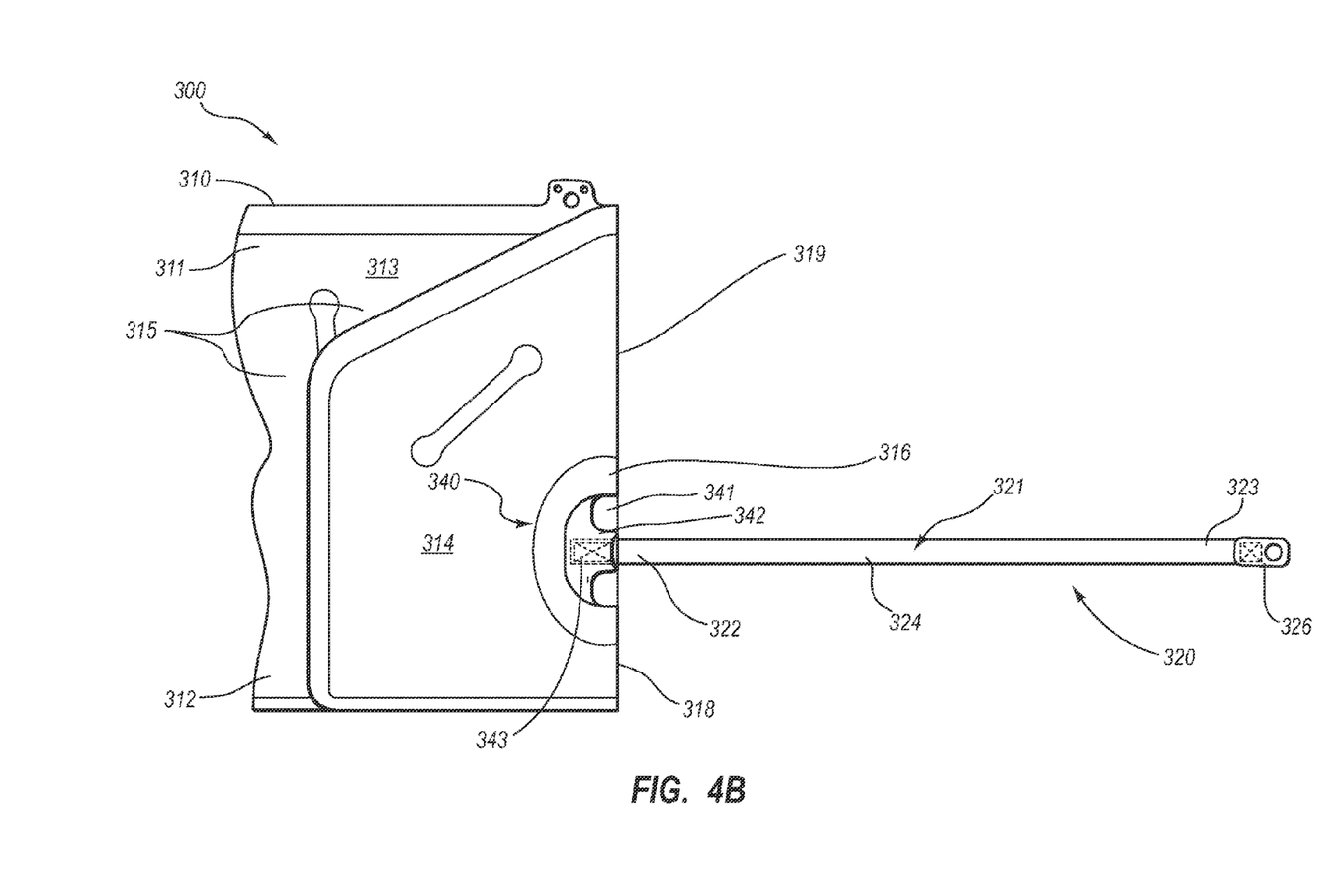

FIGS. 4A and 4B are side elevation views of another embodiment of an airbag assembly 300. Assembly 300 may be configured similarly to and may function similarly as airbag assemblies 100 and 200, described herein. As depicted in FIG. 4A, assembly 300 may comprise an inflatable airbag cushion 310 and a tether system 320. Inflatable cushion 310 may comprise a curtain cushion membrane 310 that when in an extended configuration has an upper portion 311, a lower portion 312, a front face 313, a rear face (not shown), a seam 317, a side edge 318, and a tether system coupling point 340. The various faces of cushion membrane 310 define an interior inflatable void that may be divided into inflation cells 315 that are in fluid communication with an inflator, and non-inflatable areas 316, which are not.

Tether system coupling point 340 is located on cushion 310 at a non-inflatable portion 316 and may comprise aperture 341 and a tether strap attachment point 342. Aperture 341 may be said to at least partially define tether system coupling point 340, and tether attachment point 342 may comprise a tab or an extension of cushion 310. In alternative embodiments, the coupling point may not comprise an aperture and the attachment point may not comprise an extension or tab.

FIG. 4A depicts tether system 320 as having a tether strap 321 and an anchor 326. Tether strap 321 may comprise nylon webbing or any other material known in the art and has a first end 322, a second end 323, and an extended portion 324. First end 322 may be attached to tether system coupling point 340 at attachment point 342 via attachment 343. Attachment 343 may comprise stitching or any other suitable technique that is known in the art. Attachment 343 is configured such that the long axis of tether strap 321 is substantially perpendicular to a side edge 318 of cushion 310, or a side edge that is formed by folding a cushion along fold line 319. FIGS. 4A and 4B depict strap 321 as being attached to attachment point 342 on a rear face of cushion 310; however in an alternative embodiment, attachment point 343 is located on front face 313 and the tether extends through aperture 341.

Second end 323 may be coupled to anchor 326 which is configured to be fixedly attached to a vehicle structure, such as a pillar. Anchor 326 is configured to receive mounting hardware or clip into a vehicle structure or coupling member. In this way, tether strap 321 is fixedly coupled on at least one end to a vehicle structure. Second end 323 may be coupled to anchor 326 via an attachment, which may comprise stitching or any other suitable coupling technique.

FIG. 4B depicts assembly 300 after a portion of cushion 310 has been folded at fold line 319 such that a portion of rear face 314 of cushion 310 is visible. After cushion 310 has been folded along fold line 319, a new side edge 318 is formed that is perpendicular to the long axis of strap 321 at tether attachment 342. After being folded along fold line 319, cushion 310 is configured to be rolled and thereby packaged in a pre-deployment state. After cushion 310 is rolled, tether system 320 is configured to be located substantially outside the rolled cushion; however, first end 322 of strap 321 that comprises attachment 343 may be located within the rolled cushion.

Those skilled in the art will recognize that the airbag assemblies disclosed herein may be employed in one or more methods for positioning and tensioning an inflatable airbag cushion during and after airbag deployment. Additionally, the airbag assemblies disclosed herein may be employed in one or more methods for reducing the risk of occupant ejection during a vehicle roll over event. Further, the airbag assemblies disclosed herein may be employed in one or more methods for providing full pillar overlap protection in a vehicle.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An inflatable airbag assembly comprising:
an inflatable curtain cushion having a configuration and length such that when inflated, the cushion overlaps at least one end-pillar of a vehicle, wherein the cushion has an inflatable portion and a non-inflatable portion;
a tether strap comprising a first end opposite from a second end and a middle portion between the first end and the second end,
wherein the first end of the tether strap is attached to the cushion and the second end is configured to be attached to a vehicle structure, and
wherein the tether strap has a fixed length between its first end and its second end; and
a sliding member coupled to the non-inflatable portion of the cushion at a coupling point such that the sliding member moves with the cushion when the cushion is deployed,
wherein the sliding member and the middle portion of the tether strap are positioned for the middle portion to slide in the sliding member;
wherein the assembly is configured such that when the cushion is rolled and ready for installation in a vehicle, the sliding member, the second end and at least a portion of the middle portion of the tether strap are not rolled up with the cushion;
wherein the assembly is configured such that deployment of the cushion increases the tension of the tether strap due to the fixed length of the tether strap and the configuration of the coupling point and the sliding member.

2. The airbag assembly of claim 1, wherein the second end of the tether strap is configured to be attached to the end-pillar that the cushion overlaps.

3. The airbag assembly of claim 2, wherein the first end of the tether strap is at least partially located on a back side of the cushion.

4. The airbag assembly of claim 1, wherein the coupling point is between an upper portion of the cushion and a lower portion of the cushion, wherein the first end of the tether strap is attached to the cushion at an attachment point, and wherein the attachment point is at a non-inflatable portion near the upper portion of the cushion.

5. The airbag assembly of claim 4, wherein the position of the first end of the tether strap at the attachment point and the configuration of the coupling point and the sliding member permit the tether strap to have a non-linear path between the first end and the second end of the tether strap after deployment of the cushion.

6. The airbag assembly of claim 1,
wherein the assembly is configured such that when the cushion is in a deployed state, the increased tension of the tether strap also causes tension to be placed on the cushion.

7. The airbag assembly of claim 1, wherein the sliding member is a ring.

8. The airbag assembly of claim 1, wherein the first end of the tether strap is attached to a top edge of the cushion.

9. The airbag assembly of claim 1, wherein the first end of the tether strap is attached to the cushion at an attachment point and the second end is configured to be attached to a vehicle structure via an anchor.

10. The airbag assembly of claim 1, wherein the coupling point is located on a side edge of the cushion when the cushion is in an extended configuration.

11. The airbag assembly of claim 1, wherein the coupling point is located on a side edge of the cushion when the cushion is in a rolled configuration.

12. The airbag assembly of claim 1, wherein the coupling point comprises an aperture in the cushion at a non-inflatable portion.

13. The airbag assembly of claim 12, wherein, after the cushion has been folded at a fold-line, the aperture is at least partially located at the fold-line of the cushion.

14. The airbag assembly of claim 13, wherein the fold-line defines an outside edge and the coupling point is located at the outside edge.

15. An inflatable curtain cushion assembly, comprising:
an inflatable curtain cushion comprising an inflatable portion and a non-inflatable portion, wherein the cushion is configured such that in a deployed state, the cushion extends to at least one end-pillar of a vehicle; and
a tether strap comprising
a first end that is attached to the cushion,
a second end configured to be attached to a vehicle structure, and
a middle portion that is located between the first and second ends,
wherein the tether strap has a fixed length between its first end and its second end;
a sliding member coupled to the non-inflatable portion of the cushion at a coupling point such that the sliding member moves with the cushion when the cushion is deployed,
wherein the sliding member and the middle portion of the tether strap are positioned for the middle portion to slide in the sliding member, and
wherein the sliding member is coupled to the non-inflatable portion of the cushion via a coupling strap that is attached to the non-inflatable portion of the cushion with a looped configuration;
wherein the assembly is configured such that when the cushion is in a rolled configuration and ready for installation in a vehicle, the sliding member, at least a portion of the middle portion and the second end of the tether strap are located outside of the rolled cushion; and
wherein the assembly is configured such that, when the cushion is in a deployed state, tension of the tether strap is increased, relative to the configuration of the tether strap when the cushion is in a rolled configuration, due to the fixed length of the tether strap and the configuration of the coupling point and the sliding member.

16. The airbag assembly of claim 15, wherein the coupling point comprises an aperture in an interior non-inflatable portion of the cushion, and wherein the aperture is at least partially located along a fold-line of the cushion.

17. The airbag assembly of claim 16, wherein, after the cushion has been folded at the fold-line, the aperture is at least partially located at the fold-line of the cushion.

18. The airbag assembly of claim 17, wherein after the cushion has been folded along the fold-line, the coupling strap extends through the aperture.

19. The airbag assembly of claim 15, wherein when after the cushion has been folded along the fold-line, and after the cushion has been rolled, the coupling strap is at least partially located inside the rolled cushion.

20. The airbag assembly of claim 15,
wherein the sliding member is configured such that, during inflatable cushion deployment, sliding at least part of the middle portion of the tether strap through the sliding member causes tension to be placed on the cushion.

21. The airbag assembly of claim 15, wherein the coupling point is between an upper portion of the cushion and a lower portion of the cushion, and wherein an attachment point is at a non-inflatable portion near the upper portion of the cushion.

22. The airbag assembly of claim 21, wherein the position of the first end of the tether strap at the attachment point and the configuration of the coupling point and the sliding member permit the tether strap to have a non-linear path between the first end and the second end of the tether strap after deployment of the cushion.

23. The airbag assembly of claim 15, wherein the sliding member comprises a ring that surrounds a part of the middle portion of the tether strap.

24. A method for tethering a curtain cushion to a pillar of a vehicle, comprising the steps of:
providing an inflatable airbag assembly comprising an inflatable curtain cushion, a tether strap and a sliding member,
wherein the cushion comprises inflatable and non-inflatable portions,
wherein the tether strap comprises a first end opposite from a second end and a middle portion between the first end and the second end,
wherein the first end of the tether strap is attached to the cushion and the second end is configured to be attached to a structure of the vehicle,
wherein the tether strap has a fixed length between its first end and its second end, wherein the sliding member is coupled to the non-inflatable portion of the cushion at a coupling point such that the sliding member moves with the cushion when the cushion is deployed, wherein the sliding member and the middle portion of the tether strap are positioned for the middle portion to slide in the sliding member, and wherein the curtain is rolled such that the sliding member, the second end and at least a portion of the middle portion of the tether strap are not rolled up with the cushion;

mounting the rolled cushion adjacent a head rail of the vehicle, wherein the rolled cushion has a configuration and length such that when inflated, the cushion overlaps at least one end-pillar of the vehicle; and attaching the second end of the tether strap to an end-pillar of the vehicle;

wherein the assembly is configured such that deployment of the cushion increases the tension of the tether strap due to the fixed length of the tether strap and the configuration of the coupling point and the sliding member.

25. The method of claim 24, wherein upon deployment of the cushion, the tether strap slides through the sliding member and the tether strap adopts a non-linear configuration.

26. The method of claim 24, wherein the assembly is configured such that when the cushion is in a deployed state, the increased tension of the tether strap also causes tension to be placed on cushion.

27. The method of claim 24, wherein the coupling point is at least partially located along a fold-line of the cushion and the cushion has been folded along the fold-line prior to rolling the cushion.

* * * * *